United States Patent [19]

Wachi et al.

[11] Patent Number: 4,837,762

[45] Date of Patent: Jun. 6, 1989

[54] DATA TRANSMISSION CONTROL METHOD AND APPARATUS

[75] Inventors: Isao Wachi, Hitachi; Kinji Mori, Yokohama; Yasuo Suzuki, Ebina; Masayuki Orimo, Kawasaki; Katsumi Kawano, Fuchu; Minoru Koizumi, Yokohama; Kozo Nakai, Katsuta; Hirokazu Kasashima, Hitachi, all of Japan

[73] Assignee: Hitachi, Ltd., Tokyo, Japan

[21] Appl. No.: 133,083

[22] Filed: Dec. 15, 1987

[30] Foreign Application Priority Data

Dec. 24, 1986 [JP] Japan .............................. 61-306413

[51] Int. Cl.$^4$ .............................................. H04J 3/16
[52] U.S. Cl. ...................................................... 370/89
[58] Field of Search ...................... 370/85, 89, 95, 86; 340/825.5, 825.05

[56] References Cited

U.S. PATENT DOCUMENTS 4,549,291 10/1985 Renoulin et al. ...................... 370/89
4,672,607 6/1987 Nakayashiki et al. ................. 370/89

FOREIGN PATENT DOCUMENTS 2805705 8/1979 Fed. Rep. of Germany .

OTHER PUBLICATIONS

AFIPS Conference Proceedings—1981 National Computer Conference, May 4–7, 1981, pp. 210–214.
FTCS 12th Annual International Symposium Fault—Tolerant Computing, Santa Monica, CA 22–24, Jun. 1982, pp. 187–194.

Primary Examiner—Robert L. Griffin
Assistant Examiner—Frank M. Scutch, III
Attorney, Agent, or Firm—Antonelli, Terry & Wands

[57] ABSTRACT

In a system which includes of subsystems, and a transmission medium for coupling them, and in which a token is sent to the transmission medium, whereby the transmission medium is occupied; a transmission control method characterized, at least, in that each of the certain subsystems appends a code indicative of a function of certain data to the token and sends the resulting data to the medium, and that the subsystem receiving the data refers to the code indicative of the function of the data, thereby to independently judge whether or not the data is to be accepted into the own subsystem.

4 Claims, 3 Drawing Sheets

FIG. 2
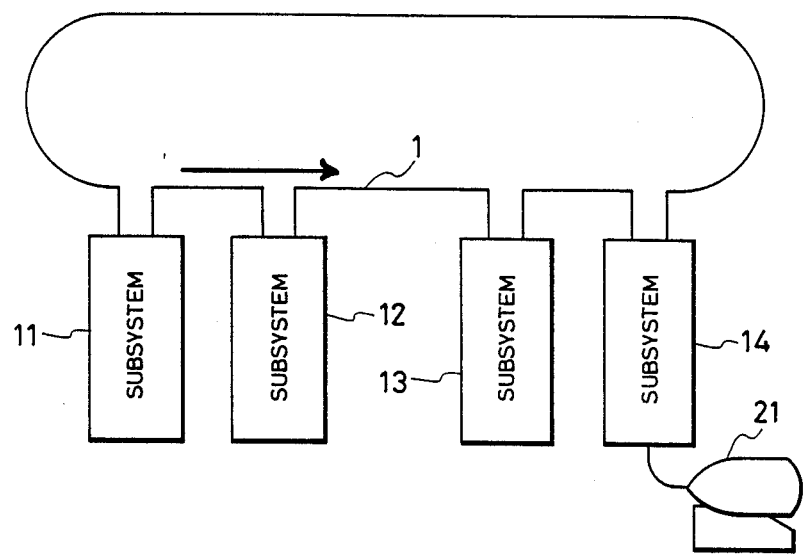
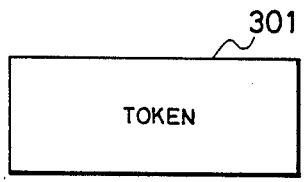
FIG. 3(a)
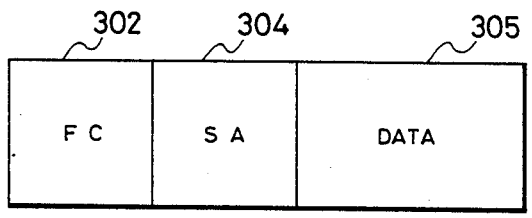
FIG. 3(b)
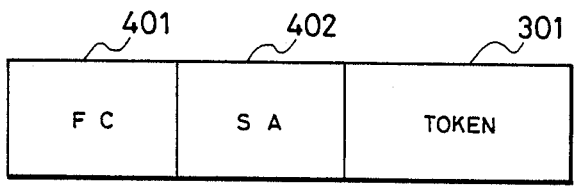
FIG. 4

DATA TRANSMISSION CONTROL METHOD AND APPARATUS

BACKGROUND OF THE INVENTION

1. Field of the Invention

The present invention relates to a transmission control method and apparatus wherein, in transmitting data, a transmission line is occupied, and the data is sent toward unspecified receivers.

2. Description of the Prior Art

As discussed in, for example, IEEE CH 1796-2 (1982), p. 606–p. 614 in a prior-art apparatus transmission is controlled by a token, which is a code for granting the use of a transmission line. However, in communicating toward unspecified receivers, for example in broadcast communication, the receiver must receive all data items irrespective of whether or not they are necessary, and the case of the reception of unnecessary data is not desired is not considered.

With the prior art, a scheme for receiving data based on the judgement of the receiver is not taken into account, and unnecessary data is received. This has posed such a problem that the capacity of a device for storing received data must be enlarged, or the processing time of the receiver increases in correspondence with the reception of the unnecessary data.

Another problem of the prior art has been that the token, which is a code for granting the use of the transmission line, is handled as a special code, whereupon processing schemes must be changed according to the reception of the token or to the reception of the on-line data.

SUMMARY OF THE INVENTION

An object of the present invention is to provide, in a system wherein data is transmitted by use of a token, a transmission control method and apparatus in which the decision of whether data delivered to a transmission line is accepted is made by a receiver, so the receiver need not receive unnecessary data, and, further, the token is handled similarly to the on-line data, so the reception processing scheme need not be changed irrespective of whether the token or the on-line data is received.

The present invention for accomplishing such an object is characterized in that a token is previously caused to flow by a subsystem connected to the transmission line, and only subsystems having received the token append codes indicative of the functions of data items to these data items when they send the data items to the transmission line in a mode in which the receiver of the token is no designated, for example, in a broadcast mode. Here, the expression "subsystem" is the general term of a network control processor, a station, a terminal equipment or information processor, a computer, etc. Further, the present invention is characterized in that all subsystems on the receivers view the codes indicative of the functions of the data items and judge whether or not the data items are necessary for their own subsystems, whereupon the necessary data items are accepted into the own subsystems.

In this manner, using the broadcast mode of the token and the code indicative of the function of the data in combination, the data can be transmitted without designating the receiver, and besides, on the basis of the code indicative of the function of the data, the receiver side can independently judge whether or not the data is required.

In addition, a code indicative of the function of data is appended to the token, likewise to the on-line data, and the token is clearly stated in the code. In this way, whether the token or the on-line data is received, the receiver side can treat the reception with quite the same reception processing without any consciousness of the token and the on-line data. This permits the control in which if the code indicative of the function of the data received by the receiver happens to specify the token, the receiver merely comes into a status capable of sending data.

The token is the code for granting the use of the transmission line, and each of the subsystems cannot deliver data to the transmission line unless it accepts the token.

Accordingly, the use of the transmission line is managed with the token.

Moreover, in sending data, each subsystem appends the code indicative of the function of the data to this data. The receiver of the data views the code indicative of the function of the data, and judges whether or not the data is necessary for that receiver.

Accordingly, even when data has been transmitted in the broadcast mode of a token protocol without designating a receiver, the receiver can receive only necessary data by reference to the code indicative of the function of the data.

Likewise to the other on-line data, the token is endowed with the code indicative of the function of data. In view of the code indicative of the function of data, the receiver judges whether or not the received data is to be gathered and used. Even when the token is specified by the code indicative of the function of the data, the receiver having received it does not accept it if it is unnecessary.

In this manner, whether or not the received data is the token, the communication is carried out on the basis of the code indicative of the function of data. Accordingly, a communication scheme need not be divided into a transfer scheme for the token and a transfer scheme for the on-line data. If the received data is the token, the subsystem having received it merely knows that the subsystem has come into a status capable of sending data.

BRIEF DESCRIPTION OF THE DRAWINGS

FIG. 2 is a diagram of the general architecture of an embodiment of the present invention;

FIG. 3(a) and FIG. 4 are constitutional diagrams showing the format of a token;

FIG. 3(b) is a diagram showing the format of data; and

DETAILED DESCRIPTION OF THE PREFERRED EMBODIMENTS

Now, an embodiment of the present invention will be described by taking a unidirectional loop transmission line as an example. Although, in the present embodiment, the unidirectional loop transmission line is employed for the brevity of the description, the system of the present invention can be adopted also for transmission lines in other aspects, such as a bidirectional loop, a bus system and a wireless network, without any hindrance.

FIG. 2 is a diagram of the general architecture of an embodiment of the present invention.

Subsystems 11-14 are connected by a unidirectional loop-type transmission line 1. If necessary, each subsystem has an external input/output device 21 connected thereto. In case of the present embodiment, the external input/output device 21 is connected to the subsystem 14.

Figure 1:
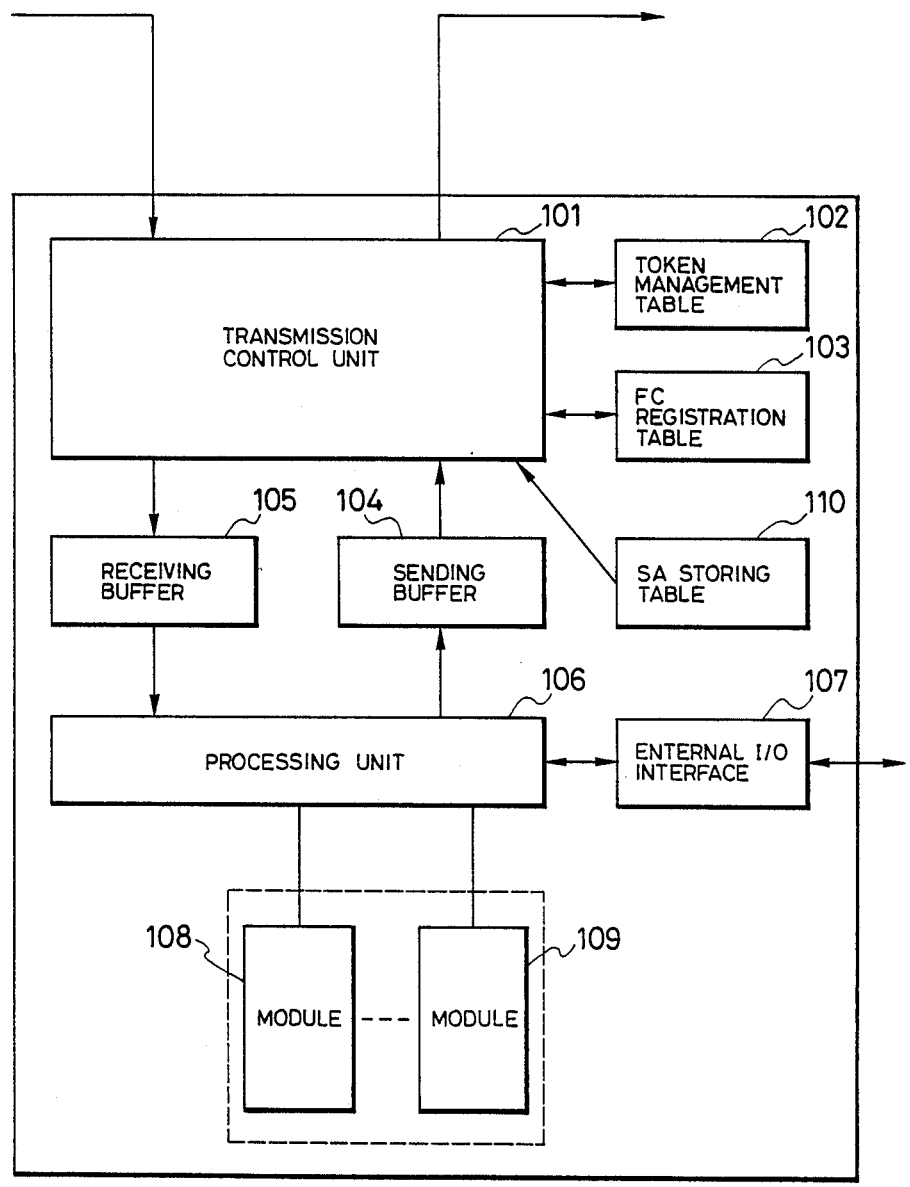
FIG. 1 is a block diagram showing the internal arrangement of a subsystem which is an embodiment of the present invention.

FIG. 1 is a diagram of the internal arrangement of each of the subsystems 11-14. All the subsystems 11, 12, 13 and 14 (FIG. 2) are constructed quite similarly.

A transmission control unit or network control processor 101 (hereinbelow, abbreviated to "NCP") is a device which manages the input/output of data from/to the transmission line 1. A token management table 102 functions to assist the NCP 101, and manages a transmission-line utilization granting code (hereinbelow, called "token"). The function code (hereinbelow, abbreviated to "FC") of data required for the subsystem to execute processing is registered in an FC registration table 103. When the FC registered in the FC registration table 103 has coincides with the FC (302 in FIG. 3(b)) of data flowing in the transmission line, the NCP 101 accepts the data of the coincident FC into its own subsystem.

The data accepted by the NCP 101 is temporarily stored in a receiving buffer 105 which is employed for adjusting the timing of the execution of processing.

A processing unit 106 gathers data from the receiving buffer 105, and delivers the gathered data to modules 108, 109 which are under the management of unit 106 and which execute actual processing. If necessary, a larger number of modules may be provided.

In addition, the processing unit 106 operates at need to gather data etc. from outside or deliver the processed result of the module to outside through an external input/output interface 107. Further, the processing unit 106 sets the FC for the processed result of the module under the management of its own or for the input data from the external I/O interface 107.

The address of the self or own NCP (hereinbelow, abbreviated to "SA") is stored in an SA storing device 110.

An example of the format of data to be sent from the NCP 101 is configured as shown in FIG. 3(b).

An FC 302 is a code which indicates the function or content of a data part 305. An SA 304 is a code which indicates the NCP that has sent the data of the format in FIG. 3(b) to the transmission line. The SA 304 is set by the NCP 101.

A token 301 shown in FIG. 3(a) is a code for granting the use of the transmission line, and the NCP 101 cannot send data to the transmission line unless it receives the token 301.

Next, the operation of the present invention will be described for individual embodiments.

[Embodiment 1]

Figure 5:
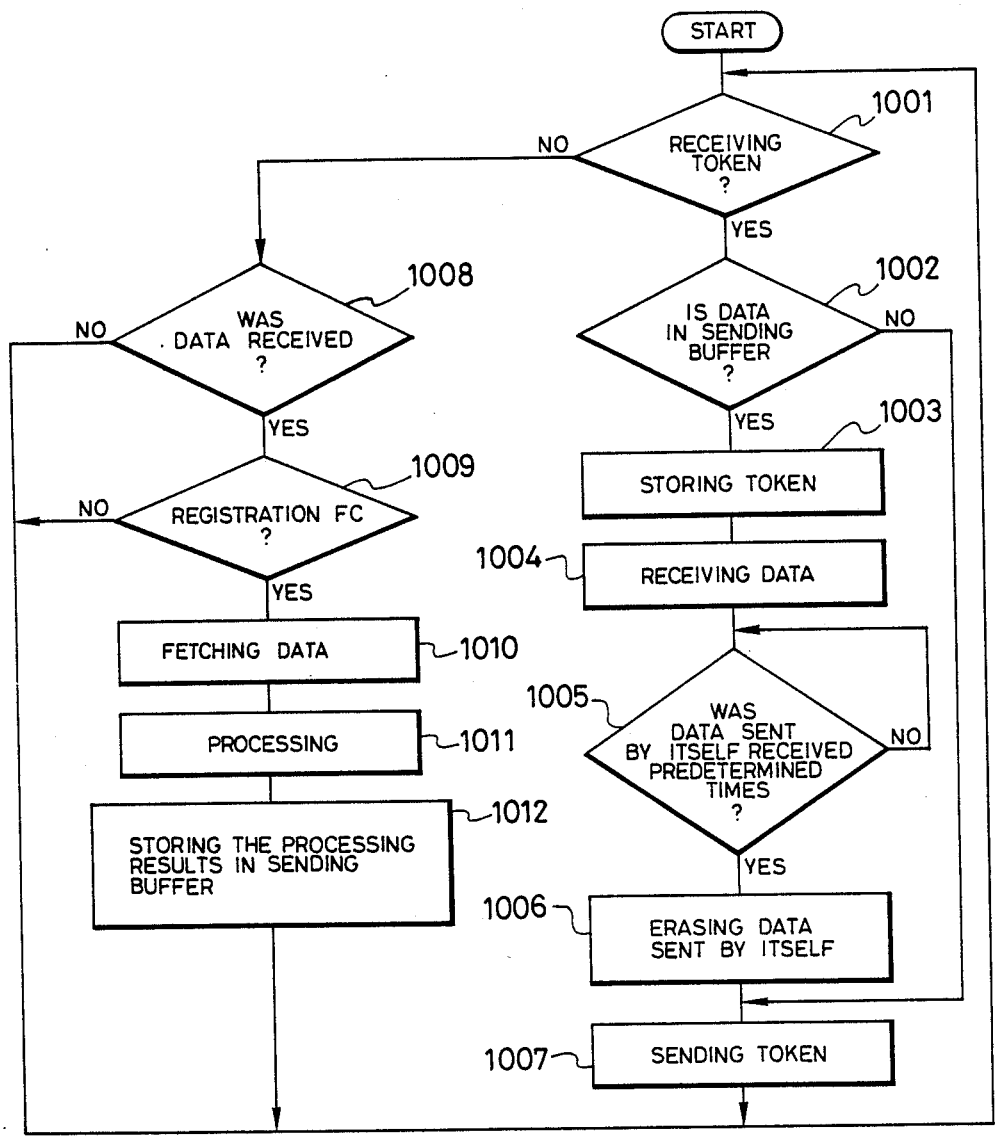
FIG. 5 is a flow chart for an embodiment of the present invention.

FIG. 5 is a flow chart showing the operations of the first and second embodiments of the present invention.

It is now assumed that the subsystem 11 has received the token 301 (step 1001).

It is assumed that the processed result of the module 108 delivered from the processing unit 106 is held in the sending buffer 104 of the subsystem 11 with the FC 302 appended thereto (step 1002).

Since the data to be sent exists in the sending buffer 104 at present, the NCP 101 of the subsystem 11, having received the token 301, stores this token 301 in the token management table 102 (step 1003). Subsequently, the NCP 101 sends data in the format of FIG. 3(b) to the transmission line 1 (step 1004). On this occasion, an address, for example, "11" which indicates that the data has been sent from the subsystem 11 is recorded as the SA 304 by the NCP 101.

The NCP 101 of each of the subsystems 12-14 refers first to the FC 302 of the data sent from the subsystem 11 (steps 1008, 1009). If the FC 302 of the data sent by the subsystem 11 is registered in the FC registration table 103 of the subsystem 12-14, the corresponding NCP 101 copies the data sent by the subsystem 11 and records and holds the data in the receiving buffer 105 of the subsystem (step 1010). Next, the processing unit 106 accepts the data held in the receiving buffer 105 and delivers the data part 305 to either or both of the modules 108, 109 under the management of the processing unit 106, thereby causing the module or modules to execute processing (step 1011). The processed result of at least one of the modules 108, 109 is endowed with the FC 302 by the processing unit 106, and is held in the sending buffer 104 (step 1012).

In this manner, the data sent by the subsystem 11 is copied by and into each subsystem requiring this data and is transmitted in succession.

When the data sent by the subsystem 11 comes back to this subsystem 11, the NCP 101 thereof refers to the SA 304 and thus recognizes that the data has been sent from that subsystem (step 1005). The NCP 101 of the subsystem 11, having recognized the data sent by its own subsystem, erases this data, and does not retransmit the data to the transmission line (step 1006). Next, the NCP 101 of the subsystem 11 sends the transmission line 1 the token 301 which is stored in the token management table 102 (step 1007).

Now, the transmission line 1 is the unidirectional loop-shaped line by way of example. Assuming that the transmitting direction of the transmission line is the direction of arrow in FIG. 2, namely, the direction of 11→12→13→14→11, the token 301 is subsequently delivered to the subsystem 12.

If data to be sent exists in the subsystem 12, it is transmitted by quite the same scheme as in the case of the subsystem 11. When the subsystem 12 does not transmit data by reason of, e.g., the nonexistence of data to be sent, the token 301 is not stored in the token management table 102 of the subsystem 12 and instead is delivered to the adjacent subsystem 13. The token 301 is successively delivered to all the subsystems by the same scheme, whereby the transmission is carried out.

According to the present embodiment, the side receiving data can discriminate data necessary for itself, with the FC at the head of the data, and hence, there is the effect that the receiving side can judge whether or not the data is necessary, without viewing the whole data.

[Embodiment 2]

Regarding a case where an FC 401 and an SA 402 are appended to the token 301 as shown in FIG. 4, an embodiment will be described using the unidirectional loop transmission line as in Embodiment 1.

In FIG. 4, an FC indicating that the data of this figure is the token is recorded as the FC 401. Besides, the address of the subsystem having sent this token 301 last is recorded as the SA 402.

The subsystems 11–14 recognize that the data of FIG. 4 is the token, by reference to the FC 401 in FIG. 4.

The subsystems 11–14 cannot transmit data unless they receive the data endowed with the FC 401 specifying the token.

Next, the operation of the second embodiment will be described in connection with the flow chart of FIG. 5.

It is now assumed that the subsystem 11 has received the token in the format of FIG. 4. On this occasion, the NCP 101 of the subsystem 11 refers to the FC 401, thereby to recognize that the data of FIG. 4 is the token (step 1001). The NCP 101 of the subsystem 11 having recognized the token in FIG. 4, stops the token 301 in itself and checks whether or not data to be sent exists (step 1002). If data to be sent exists, the token 301 is stored in the token management table 102 (step 1003).

Then, the method of transmitting the data proceeds in quite the same way as in Embodiment 1 (steps 1004–1006).

When the data sent by the subsystem 11 comes back to this subsystem 11, the NCP 101 of the subsystem 11 erases the data in quite the same manner as in Embodiment 1 (step 1006). Subsequently, the NCP 101 of the subsystem 11 takes out the token 301 from within the token management table 102 and endows the token 301 with the FC 401 specifying the token and the self address SA 402, whereupon it sends the token to the transmission line 1 in the format of FIG. 4 (step 1007).

By referring to the FC 401, the subsystem 12 recognizes that the token sent by the subsystem 11 is allotted thereto. If the subsystem 12 is in a status requiring the token, the transmission control unit 101 thereof stores the token in the token management table 102 and thereafter executes quite the same processing as in the subsystem 11. If the token is not required, the transmission control unit does not store the token 301 in the token management table 102, and it sends the token with the FC 401 indicative of the token and the self address 402 appended thereto.

In this way, the token is allotted to the subsystems 11–14, and the data is transmitted just as in Embodiment 1.

Besides, in case of the present embodiment, the token can be handled similarly to the other on-line data. More specifically, if the token is received, each subsystem copies it and accepts it therein, and it can know that the own subsystem is now in a status capable of transmission. Further, when the use of the token has ended, the subsystem broadcasts the token to the transmission line, and if the token sent by the own subsystem has returned, the subsystem erases it.

In this manner, each subsystem can independently manage the token owing to the FC and the SA.

According to the present embodiment, whether or not data is the token is judged from the FC, and hence, there is the effect that the whole data sent need not be reviewed and that the processing speed can be raised.

The transmission processing of the token can be conducted by appending the FC also to the token and transmitting the token similarly to the on-line data. This produces the effect that both the token and the on-line data may be subjected to the same transmission processing, so the transmission processing scheme can be simplified.

In Embodiments 1 and 2, there has been explained the scheme in which the subsystem stores the token in itself and occupies the transmission line. However, even when another token protocol is used, merely the steps 1003 and 1007 in FIG. 5 change into, for example, "Token is in use" and "Token is free" respectively, and the present invention can be applied with the basic processing held quite similar.

In addition, the token has been allotted in a store-and-forward fashion, but it is to be understood that the present invention is similarly applicable to a scheme in which a subsystem to have the token subsequently allotted thereto is designated.

Besides, although the transmission line in the foregoing has been explained as to the case of using such a line as electric wire or optical fiber, the invention can be similarly performed for a network in any aspect or a wireless system as already stated.

According to the present invention, the following effects are attained:

Using the broadcast mode of a token and an FC in combination, a side receiving data can select data necessary for itself. Therefore, when compared with a case where data is transmitted with only the broadcast mode of the token, the invention can raise the processing speed of the data receiving side in correspondence with unnecessary data not received. Moreover, the capacity of a device for storing the received data may be smaller.

We claim:

1. A method of controlling the transmission of data in a data transmission system having a plurality of sending-/receiving stations coupled together by a transmission medium, said method comprising the steps of:

within a first sending/receiving station having data to be transmitted, receiving a transmission token authorizing transmission of data on the transmission medium; appending to the transmission token a code indicative of the function of the data which said first sending/receiving station has for transmission; and applying the transmission token, with the code appended thereto, and the data to the transmission medium for transmission to the sending/receiving stations of the system; and within each of the receiving sending/receiving stations, detecting the appended code transmitted on the transmission medium; determining whether the detected code is indicative of a data function required by the detecting sending/receiving station; and receiving into the detecting sending/receiving station data transmitted with those transmission tokens having appended thereto a code indicative of a data function required by such sending/receiving station.

2. A method as defined in claim 1, further comprising appending to the data a second code identifying said first sending/receiving station prior to applying the data to the transmission medium.

3. Apparatus for controlling the transmission of data in a data transmission system having a plurality of sending/receiving stations coupled together by a transmission medium, said apparatus comprising:

means within each of said sending/receiving stations for receiving a transmission token authorizing transmission of data on the transmission medium;

means within each of said sending/receiving stations for appending to the transmission token a code indicative of the function of data to be transmitted by such sending/receiving station;

means within each of said sending/receiving stations for applying the transmission token, with the code appended thereto, and data to said transmission medium for transmission to said sending/receiving stations;

means within each of said sending/receiving stations for detecting the appended code transmitted on the transmission medium;

means within each of said sending/receiving stations for determining whether the detected code is indicative of a data function required by such detecting sending/receiving station; and means within each of said sending/receiving stations for receiving into such sending receiving stations data transmitted with those transmission tokens having appended thereto a code indicative of a data function required by such detecting sending-/receiving station.

4. Apparatus as defined in claim 3, further comprising means for appending to the data a second code identifying the sending/receiving station applying the data to the transmission medium.

* * * * *